(12) United States Patent
Mori et al.

(10) Patent No.: US 9,295,931 B2
(45) Date of Patent: Mar. 29, 2016

(54) POROUS POLYTETRAFLUOROETHYLENE MEMBRANE AND AIR FILTER MEDIUM

(75) Inventors: Masaaki Mori, Osaka (JP); Yuri Horie, Osaka (JP); Shunichi Shimatani, Osaka (JP)

(73) Assignee: Nitto Denko Corporation, Osaka (JP)

( * ) Notice: Subject to any disclaimer, the term of this patent is extended or adjusted under 35 U.S.C. 154(b) by 275 days.

(21) Appl. No.: 14/130,828

(22) PCT Filed: Jul. 4, 2012

(86) PCT No.: PCT/JP2012/004346
§ 371 (c)(1),
(2), (4) Date: Jan. 30, 2014

(87) PCT Pub. No.: WO2013/005430
PCT Pub. Date: Jan. 10, 2013

(65) Prior Publication Data
US 2014/0130470 A1 May 15, 2014

(30) Foreign Application Priority Data
Jul. 5, 2011 (JP) .................................. 2011-149001

(51) Int. Cl.
*B01D 39/20* (2006.01)
*B01D 69/02* (2006.01)
(Continued)

(52) U.S. Cl.
CPC ........ *B01D 39/2068* (2013.01); *B01D 39/1692* (2013.01); *B01D 46/521* (2013.01); *B01D 67/0027* (2013.01); *B01D 69/02* (2013.01);
(Continued)

(58) Field of Classification Search
CPC ........... B01D 39/2068; B01D 39/1692; B01D 46/521; B01D 67/0027; B01D 69/02; B01D 71/36; B29C 55/005; B29C 55/14; B29C 55/18; B29K 2027/18
See application file for complete search history.

(56) References Cited

U.S. PATENT DOCUMENTS 3,766,133 A * 10/1973 Roberts ..................... B29B 9/08
246/117
5,910,277 A * 6/1999 Ishino .................. B01D 39/083
264/127
(Continued)

FOREIGN PATENT DOCUMENTS

EP 0 808 648 11/1997
JP 11-080397 3/1999
(Continued)

OTHER PUBLICATIONS

Extended European Search Report issued in EP Application No. 12807267.5 on Feb. 17, 2015, 6 pgs.

*Primary Examiner* — Anthony Shumate
(74) *Attorney, Agent, or Firm* — Hamre, Schumann, Mueller & Larson, P.C.

(57) ABSTRACT

Provided is a porous polytetrafluoroethylene (PTFE) membrane having a PF value of 36 or more and a mass per unit area of 0.90 g/m$^2$ or less. The PF value is determined by the following equation: PF value={−log(PT (%)/100)/(PL(Pa)/9.8)}×100. PT (permeability) is determined by PT (%)=100−CE (%), CE (collection efficiency) is determined by a value measured using dioctyl phthalate particles with a particle diameter of 0.10 μm to 0.20 μm under a condition of a permeate flow rate of 5.3 cm/sec, and PL (pressure loss) is determined by a value measured under a condition of a permeate flow rate of 5.3 cm/sec. This porous PTFE membrane is suitable for air filter media.

10 Claims, 2 Drawing Sheets

(51) Int. Cl.
  *B01D 71/36* (2006.01)
  *B01D 46/52* (2006.01)
  *B01D 67/00* (2006.01)
  *B29C 55/00* (2006.01)
  *B29C 55/14* (2006.01)
  *B29C 55/18* (2006.01)
  *B01D 39/16* (2006.01)
  *B29K 27/18* (2006.01)

(52) U.S. Cl.
  CPC ............. *B01D 71/36* (2013.01); *B29C 55/005* (2013.01); *B29C 55/14* (2013.01); *B29C 55/18* (2013.01); *B29K 2027/18* (2013.01)

(56) References Cited

U.S. PATENT DOCUMENTS

| | | | | |
|---|---|---|---|---|
| 6,030,428 | A * | 2/2000 | Ishino | B01D 39/083 55/486 |
| 6,149,702 | A * | 11/2000 | Kawano | B01D 39/1692 55/497 |
| 6,261,979 | B1 * | 7/2001 | Tanaka | B01D 67/0027 210/493.5 |
| 6,302,934 | B1 * | 10/2001 | Nabata | B01D 39/1692 55/486 |
| 6,355,135 | B1 * | 3/2002 | Inoue | B32B 37/04 156/164 |
| 6,391,075 | B1 * | 5/2002 | Meiji | B01D 39/1623 454/187 |
| 6,416,562 | B1 | 7/2002 | Shibuya et al. | |
| 7,387,700 | B2 | 6/2008 | Tanaka et al. | |
| 7,815,727 | B2 * | 10/2010 | Kawato | C08K 9/02 106/400 |
| 8,419,839 | B2 * | 4/2013 | Shimatani | B01D 71/36 156/229 |
| 8,449,660 | B2 * | 5/2013 | Shimatani | B01D 65/10 95/12 |
| 9,072,993 | B2 * | 7/2015 | Inui | B01D 46/521 |
| 2003/0005669 | A1 * | 1/2003 | Maeoka | B01D 39/163 55/486 |
| 2004/0168417 | A1 * | 9/2004 | Tanaka | B01D 39/1692 55/486 |
| 2006/0029795 | A1 * | 2/2006 | Sawyer | B32B 5/14 428/339 |
| 2008/0176112 | A1 * | 7/2008 | Lu | H01M 4/8605 429/430 |
| 2008/0192407 | A1 * | 8/2008 | Lu | H01G 11/24 361/502 |
| 2010/0183951 | A1 * | 7/2010 | Lu | H01M 4/8605 429/513 |
| 2012/0231375 | A1 * | 9/2012 | Lu | H01M 4/8605 429/530 |
| 2013/0097982 | A1 | 4/2013 | Inui et al. | |
| 2014/0196840 | A1 * | 7/2014 | Ishii | B01D 39/16 156/244.11 |
| 2015/0082757 | A1 * | 3/2015 | Chaen | B32B 27/322 55/482 |

FOREIGN PATENT DOCUMENTS

| | | |
|---|---|---|
| JP | 2001-170461 | 6/2001 |
| JP | 2002-301343 | 10/2002 |
| JP | 2006-061830 | 3/2006 |
| JP | 2009-024040 | 2/2009 |
| JP | 2009-179656 | 8/2009 |
| JP | 2012-172085 | 9/2012 |
| WO | 2011/158717 | 12/2011 |

\* cited by examiner

POROUS POLYTETRAFLUOROETHYLENE MEMBRANE AND AIR FILTER MEDIUM

TECHNICAL FIELD

The present invention relates to a porous polytetrafluoroethylene (hereinafter referred to as "PTFE") membrane and an air filter medium using the porous PTFE membrane.

BACKGROUND ART

Porous PTFE membranes are generally produced as follows. A mixture obtained by mixing a PTFE fine powder and a liquid lubricant serving as an extrusion aid is extrusion-molded, and the resulting molded body is rolled to form a PTFE sheet. The liquid lubricant is removed from the PTFE sheet, and then the resulting PTFE sheet, from which the liquid lubricant has been removed, is stretched to make the sheet porous. Thus, a porous PTFE membrane is produced (see, for example, Patent Literature 1). The porous PTFE membrane thus obtained has a porous structure of nodes and fibrils, as is well known.

When the porous PTFE membrane is used as a collection layer of an air filter medium, it is usually bonded to an air-permeable support member such as a nonwoven fabric to provide the required strength to the membrane. The porous PTFE membrane and the air-permeable support member are bonded together by heat lamination, lamination using an adhesive (adhesive lamination), or the like.

Pressure loss and collection efficiency are important properties of an air filter medium. However, it is difficult to achieve a good balance between these two properties because one of them tends to deteriorate when the other improves. A PF value is often used as a measure for evaluating whether the pressure loss and the collection efficiency are well balanced or not. The PF value is calculated by the following Equation (1). The higher the PF value of an air filter medium, the higher the performance thereof. In Equation (1), the permeability PT and the collection efficiency CE have a relationship expressed by the following Equation (2). PL is the pressure loss.

$$PF\ \text{value} = \{-\log(PT(\%)/100)/(PL(\text{mmH}_2\text{O}))\} \times 100 \quad (1)$$

$$PT(\%) = 100 - CE\ (\%) \quad (2)$$

An air filter medium requires a porous PTFE membrane having a high PF value to achieve a good balance between pressure loss and collection efficiency. In order to produce a porous PTFE membrane having a high PF value, various improvements have been proposed for each step of porous PTFE membrane production methods.

For example, Patent Literature 1 proposes that in the step of stretching a PTFE sheet to make the sheet porous, after stretching in the longitudinal direction (MD direction), the PTFE sheet be stretched in the transverse direction (TD direction) at a high stretching speed (paragraph 0023). Patent Literature 2 proposes that in the step of mixing a PTFE fine powder and a liquid lubricant, a large amount of liquid lubricant be added (paragraphs 0053 to 0055).

CITATION LIST

Patent Literature

Patent Literature 1: JP 2001-170461 A
Patent Literature 2: JP 2002-301343 A

SUMMARY OF INVENTION

Technical Problem

According to the production method disclosed in Patent Literature 1, the diameter of fibrils constituting the porous PTFE membrane is reduced, and thus the PF value increases. However, there is a limit in increasing the PF value by this improvement. According to the production method disclosed in Patent Literature 2, the diameter of fibrils is reduced and the distance between the fibrils is increased, and thus the PF value further increases. However, this improvement causes a decrease in the collection performance per unit thickness of the porous PTFE membrane in exchange for an increase in the PF value. The thickness of the porous PTFE membrane can be increased to compensate for the decrease in the collection performance. However, when the thickness of the porous PTFE membrane is increased to increase the PF value, the mass per unit area of the membrane increases significantly. The increase in the mass per unit area leads to an increase in the amount of PTFE required to produce a porous membrane, in other words, to an increase in the cost of the raw material.

Conventionally known proposals to increase the PF value still leave room for improvement. Therefore, it is an object of the present invention to provide a novel porous PTFE membrane having a high PF value and being advantageous in terms of the efficiency in the use of a PTFE material. It is another object of the present invention to provide a novel air filter medium using the porous PTFE membrane according to the present invention.

Solution to Problem

The present invention provides a porous PTFE membrane having a PF value of 36 or more and a mass per unit area of 0.90 g/m$^2$ or less. The PF value is determined by the above Equation (1).

Equation (1) can be expressed as follows if "Pa" is used as the unit of the pressure.

$$PF\ \text{value} = \{-\log(PT(\%)/100)/(PL(\text{Pa})/9.8)\} \times 100$$

In this equation, PT is the permeability and is determined by PT (%)=100−CE (%), as shown above as Equation (2). CE is the collection efficiency and is determined by a value measured using dioctyl phthalate particles with a particle diameter of 0.10 μm to 0.20 μm under a condition of a permeate flow rate of 5.3 cm/sec. PL is the pressure loss and is determined by a value measured under a condition of a permeate flow rate of 5.3 cm/sec.

Another aspect of the present invention provides an air filter medium including: the porous PTFE membrane of the present invention; and an air-permeable support member laminated on the membrane.

Advantageous Effects of Invention

The present invention makes it possible to provide a porous PTFE membrane having a high PF value and a low mass per unit area and thus having an advantage over conventional ones in terms of the efficiency in the use of a PTFE material, and to provide an air filter medium using this porous PTFE membrane. A low mass per unit area is a preferred feature that contributes also to a reduction in the weight of the resulting product.

DESCRIPTION OF EMBODIMENTS

Figure 1:
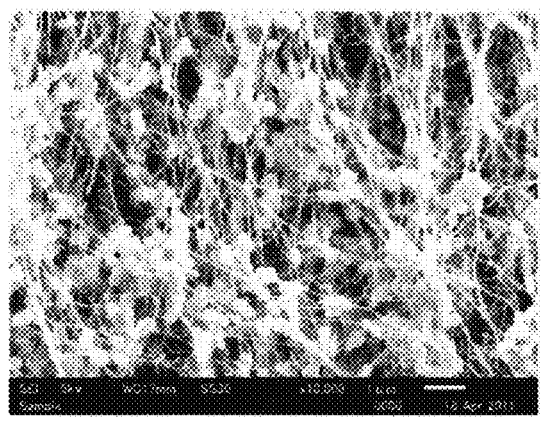
FIG. 1 is a SEM (scanning electron microscope) micrograph of a porous PTFE membrane obtained in Example 2.

The porous PTFE membrane of the present invention can be obtained by the following production method. The following method is suitable for the production of a porous PTFE membrane to increase the PF value while suppressing an increase in the mass per unit area, and in particular for the production of the porous PTFE membrane of the present invention. However, the porous PTFE membrane of the present invention is not limited to that produced by the following method.

The method of the present embodiment suitable for the production of the porous PTFE membrane of the present invention is a method for producing a porous PTFE membrane, including: a step A of extruding a mixture containing a PTFE fine powder having a standard specific gravity of 2.19 or less and a liquid lubricant into a sheet form using a flat die so as to obtain a PTFE sheet; a step B of rolling the PTFE sheet by passing the sheet between a pair of rolls in the longitudinal direction of the sheet as the extrusion direction in the step A; a step C of stretching the PTFE sheet in a transverse direction perpendicular to the longitudinal direction of the sheet; a step D of removing the liquid lubricant from the PTFE sheet that has been rolled in the step B and stretched in the step C; and a step E of stretching the PTFE sheet, from which the liquid lubricant has been removed in the step D, in the longitudinal direction and in the transverse direction of the sheet, respectively, so as to obtain a porous PTFE membrane. This production method may further include a step F of sintering the porous PTFE membrane at a temperature equal to or higher than the melting point of PTFE.

Conventionally, a mixture containing a PTFE fine powder and a liquid lubricant is extruded into a round bar form (paragraph 0075 of Patent Literature 1 and paragraph 0080 of Patent Literature 2). This is because there is no need to extrude the mixture into a sheet form only for the purpose of obtaining a PTFE sheet because the round bar is rolled into a sheet anyway in the subsequent rolling step. In contrast, in the production method of the present embodiment, the mixture is extruded into a sheet form using a flat die (T-die) (Step A).

Next, the PTFE sheet extruded from the die is rolled by being passed between the pair of rolls in its longitudinal direction (an MD direction or a machine direction, which is the extrusion direction in the step A) (Step B). Roll rolling is conventionally performed. However, since rolling is conventionally performed on a PTFE molded body (PTFE bar) obtained by extruding the mixture into a round bar form, the PTFE molded body is rolled out in its transverse direction perpendicular to the longitudinal direction (a TD direction, which is a direction perpendicular to the machine direction) so as to obtain an extended thin sheet.

In contrast, in the present embodiment, a pre-extruded sheet-like PTFE molded body (PTFE sheet) is subjected to rolling. Therefore, the PTFE molded body is stretched primarily in the rotational direction of the surface of the rolls, that is, the longitudinal direction of the molded body. Therefore, the step B is essentially the step of roll-stretching the sheet in its longitudinal direction. A stress applied to the PTFE molded body and the resulting stretching direction are significantly different from those in the conventional methods, although basically the same apparatus is used.

Subsequently, the rolled PTFE sheet is stretched in its transverse direction (Step C). Thus, in these stretching steps, the PTFE sheet containing the liquid lubricant is stretched in the longitudinal direction and then in the transverse direction sequentially.

The step C may be performed before the step B. That is, the PTFE sheet obtained in the step A may be stretched in its transverse direction (Step C) and then rolled (or stretched) in its longitudinal direction using rolls (Step B).

The subsequent steps D and E are performed basically in the same manner as in the conventional methods. Specifically, first the PTFE sheet is heated to remove the liquid lubricant (Step D). Subsequently, the PTFE sheet is stretched in its longitudinal direction and transverse direction to produce a porous PTFE membrane (Step E). Preferably, the step E is performed at a temperature lower than the melting point of PTFE. Then, the porous PTFE membrane may be heated at a temperature equal to or higher than the melting point of PTFE so as to be sintered (Step F). As conventionally performed, the stretch ratio is adjusted as appropriate in the step E to obtain desired physical properties, for example, desired collection efficiency and pressure loss. In the production method of the present embodiment, the area stretch ratio calculated as the product of the stretch ratio in the longitudinal direction and the stretch ratio in the transverse direction is suitably 150 to 700.

The porous PTFE membrane obtained through the above steps sometimes exhibits new distinctive features in its membrane structure that have not been observed in conventional porous PTFE membranes. Presumably, the extrusion using a flat die and the sequential wet stretchings of the PTFE sheet in the longitudinal direction and the transverse direction contribute to the exhibition of these features. More specifically, it is presumed that the fibrillation of the PTFE fine powder is affected by the stress applied thereto in the flat die and the stress applied thereto by the sequential wet stretchings, which causes a change in the membrane structure.

This membrane structure has specific features compared with those of the membrane structure of porous PTFE membranes obtained by conventional typical production methods in which a round bar-shaped PTFE molded body obtained by extrusion is rolled into a sheet and the sheet is subjected to stretching to make it porous without being subjected to wet stretching in the transverse direction. The features of the membrane structure are as follows.

First, the diameter of fibrils is reduced. Second, the size of nodes is reduced and the number of nodes per unit membrane volume is increased. Third, the ratio of fibrils extending in directions other than the stretching directions is increased, in other words, the fibrils are oriented more randomly and extend more isotropically. In view of these features, it is a reasonable guess that the use of the production method of the present invention makes the PTFE fine powder more susceptible to fibrillation. In addition, this membrane structure, in which thin fibrils extend not in a specific direction but in more random directions and nodes are divided into smaller ones, is basically suitable for increasing the PF value of the porous PTFE membrane.

Figure 3:
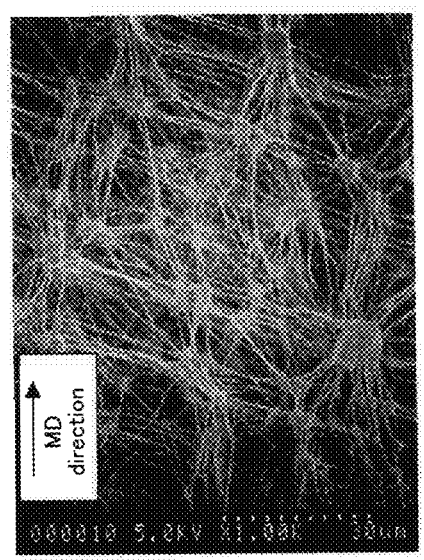
FIG. 3 is a SEM micrograph of a porous PTFE membrane obtained in Comparative Example 4.

As shown in FIG. 1, the size and shape of the fine particles, herein referred to as "nodes", are significantly different from those of conventional nodes (see FIG. 3). There is room for discussion whether these particles can be identified as the conventional nodes, but they are referred to as "nodes" herein for descriptive purposes.

It is preferable to use a PTFE fine powder having a standard specific gravity of 2.19 or less as a raw material. The standard specific gravity, which is also referred to as "SSG", is the specific gravity determined by the measurement method according to Japanese Industrial Standards (JIS) K6892. It is known that the standard specific gravity tends to be negatively correlated with the average molecular weight (the smaller the standard specific gravity, the higher the average molecular weight). For example, the standard specific gravity and the average molecular weight of Fluon CD-123 (manufactured by Asahi Fluoropolymers, Co., Ltd.) are 2.155 and 12,000,000, respectively. The standard specific gravity and the average molecular weight of Fluon CD-145 (manufactured by Asahi Fluoropolymers, Co., Ltd.) are 2.165 and 8,000,000, respectively. The standard specific gravity and the average molecular weight of Fluon CD-1 (manufactured by Asahi Fluoropolymers, Co., Ltd.) are 2.20 and 2,000,000, respectively.

If the above-described improved method is applied to a mixture containing a PTFE fine powder having a standard specific gravity of more than the above-mentioned upper limit, the resulting PTFE sheet becomes susceptible to defects in the stretching step after the liquid lubricant is removed, which makes it difficult to obtain a porous PTFE membrane having desired properties. Probably, this is because when the molecular weight of the PTFE fine powder is too low, thin fibrils formed by stretching are easily broken.

The increase in the PF values of porous PTFE membranes as conventionally proposed has been achieved by increasing the distance between fibrils while keeping the diameter of fibrils small. According to Patent Literature 1 focusing not on the increase of the distance between fibrils but only on the reduction of the fibril diameter, PF values up to 35 are obtained (Example 2). As a matter of fact, it seems that about 35 is the highest possible PF value and cannot be increased anymore only by reducing the diameter of fibrils. According to Patent Literature 2, the collection efficiency of each fibril is decreased by interaction between fibrils, which prevents the increase of the PF value (paragraphs 0007 to 0012). In Patent Literature 2, the amount of a liquid lubricant to be mixed with a PTFE fine powder is increased to reduce the filling factor of the resulting porous PTFE membrane and thereby to increase the distance between fibrils. Examples of Patent Literature 2 disclose porous PTFE membranes of Examples 1 and 2, having an average fibril diameter (average fiber diameter) of 49 to 53 nm and a PF value of 39.2 to 42.0. The filling factor of these membranes is 4.0 to 4.5% and the thickness thereof is 15.0 to 16.0 μm. Therefore, the mass per unit area of these membranes is about 1.30 to 1.56 g/m², as calculated based on the specific gravity of PTFE. There is room for improvement in these values in terms of the efficiency in the use of a PTFE material.

The porous PTFE membrane disclosed in Patent Literature 2 is adjusted so as to increase the distance between fibrils while maintaining the basic shape of fibrils and nodes commonly observed in conventional membranes. The collection efficiency per unit thickness CE(t) of this porous PTFE membrane is basically the same as that of conventional membranes. The CE(t) of the porous PTFE membranes of Examples of Patent Literature 2 is about 58 to 60%, as calculated by the method described later, which is almost the same as the CE(t) of the membranes of Comparative Examples. Presumably, a decrease in the pressure loss is the main reason why the porous PTFE membranes disclosed in Patent Literature 2 achieve high PF values.

As described above, an improvement in the shape of fibrils and nodes constituting the membrane makes it possible to provide a porous PTFE membrane having a PF value of 36 or more and a mass per unit area of 0.90 g/m² or less, as is confirmed by the examples described below.

According to the present invention, it is also possible to provide a porous PTFE membrane having an increased PF value, specifically 37 or more, further 38 or more, particularly 39 or more, and in some cases 40 or more. The porous PTFE membrane of the present invention can have a mass per unit area of 0.90 g/m² or less, further 0.87 g/m² or less, and particularly 0.85 g/m² or less, while maintaining its PF value in the above range of values. Needless to say, a low mass per unit area is a desirable feature that leads directly to a reduction in material cost and product weight. The lower limit of the mass per unit area is not particularly limited, but the mass per unit area of the porous PTFE membrane of the present invention is, for example, 0.40 g/m² or more, and particularly 0.50 g/m² or more.

It is also possible to increase the PF value without excessively reducing the average fibril diameter (average fiber diameter) of the porous PTFE membrane. The average diameter of the fibrils of the porous PTFE membrane of the present invention is, for example, 55 nm or more, and further 57 nm or more. Not-too-thin fibrils are useful in maintaining the strength of the membrane. The upper limit of the average diameter of fibrils is not particularly limited, but the average diameter of the fibrils of the porous PTFE membrane of the present invention is, for example, 83 nm or less, and particularly 80 nm or less. The porous PTFE membrane of the present invention can achieve a larger fibril diameter than conventional porous PTFE membranes as disclosed in Patent Literature 2, as long as they are compared within the range of comparable PF values.

The filling factor of the porous PTFE membrane of the present invention is, for example, 2.7% or more, further 2.9% or more, and it is, for example, 3.9% or less.

The filling factor (FF) can be related to the void content (porosity) (VC) of the membrane, as shown in the following Equation (3).

$$FF\ (\%) = 100 - VC\ (\%) \tag{3}$$

According to the present invention, it is possible to increase the collection efficiency per 1 μm thickness (CE(t)) of the porous PTFE membrane to 76% or more, further 80% or more, and in some cases 82% or more. The CE(t) is calculated by the following Equation (4).

$$CE(t)(\%) = \{1 - (1 - CE\ (\%)/100)^{1/t}\} \times 100 \tag{4}$$

The CE (collection efficiency) values used herein are also those obtained under the measurement conditions described above. Herein, t is the thickness of the porous PTFE membrane, and the thickness is measured in units of μm.

Equation (4) is derived from the fact that the permeability PT, the permeability per unit thickness PT(t), the collection efficiency CE, and the collection efficiency per unit thickness CE(t) satisfy the relations: $PT = PT(t)^t$, $CE(t) = 1 - PT(t)$, and $CE = 1 - PT$, respectively.

A porous PTFE membrane obtained by a conventional production method usually has a too high pressure loss for use in an air filter medium if the collection efficiency per 1 μm thickness of the membrane is adjusted to about 76% or more. However, according to the present invention, it is possible to prevent a significant increase in the pressure loss even if the collection efficiency per 1 μm thickness of the porous PTFE membrane is increased to a value as high as the value mentioned above.

Therefore, another aspect of the present invention provides a porous PTFE membrane having a collection efficiency per 1

μm thickness CE(t) of 76% or more and less than 85% and a pressure loss per 1 μm thickness PL(t) of 13 Pa or more and less than 20 Pa, more specifically 15 Pa or more and 19.5 Pa or less, as calculated by the following Equation (5).

Still another aspect of the present invention provides a porous PTFE membrane having a collection efficiency per 1 μm thickness CE(t) of 85% or more and 95% or less and a pressure loss per 1 μm thickness PL(t) of 18 Pa or more and 25 Pa or less, more specifically 20 Pa or more and 25 Pa or less, as calculated by the following Equation (5).

$$PL(t)(Pa)=PL(Pa)/t(\mu m) \quad (5)$$

The pressure loss PL values used herein are also those obtained under the measurement conditions described above.

As described above, the improvement proposed in Patent Literature 2 is not intended to improve the collection efficiency per unit thickness. In the case of a production method to which improvements of the present invention are not fully applied, even if the production conditions are modified by a technique known to those skilled in the art, specifically by adjustment of the stretch ratio, the pressure loss per 1 μm thickness of a porous membrane whose collection efficiency per 1 μm thickness is adjusted to about 74 to 75% is much higher than 20 Pa (see Comparative Example 1 described below).

According to the present invention, it is also possible to obtain a porous homo-PTFE membrane having both a high PF value and a not-too-high mass per unit area within the ranges mentioned above. The term "homo-PTFE" refers to a polymer made of only one type of monomer, and the monomer is TFE (tetrafluoroethylene), as is well known. On the other hand, a copolymer containing TFE and a monomer other than TFE is referred to as modified PTFE. Functional materials such as a photocatalyst, carbon black, and a moisture absorbent may be added to a porous homo-PTFE membrane, when necessary. In this light, it should be noted that a porous homo-PTFE membrane is not necessarily a membrane consisting of only homo-PTFE. In this description, the "porous homo-PTFE membrane" refers specifically to a porous membrane in which the polymer constituting the membrane is made of only one type of monomer, and the monomer is TFE.

According to the present invention, it is also possible to obtain a porous PTFE membrane having both a high PF value and a not-too-high mass per unit area even if the membrane is not a multilayer membrane but a single-layer membrane. Generally, single-layer membranes are advantageous over multilayer membranes in terms of production cost. That is, it is preferable that the porous PTFE membrane of the present invention be a single-layer membrane.

Hereinafter, each step of the production method of the present embodiment is described in more detail.

In the step A, the mixing ratio of the PTFE fine powder and the liquid lubricant is suitably adjusted so that the mixture contains, for example, 5 to 50 parts by mass of the liquid lubricant, particularly 5 to 30 parts by mass of the liquid lubricant, per 100 parts by mass of the PTFE fine powder. As the liquid lubricant, a conventionally used hydrocarbon oil such as liquid paraffin or naphtha can be used.

In the step A, a flat die is used for extrusion of the mixture containing the PTFE fine powder. Examples of the flat die (T-die) include a straight manifold type T-die, a coat hanger type T-die, and a fishtail type T-die. Since the extrusion molding in the step A is not extrusion molding of a molten material but extrusion molding of a pasty material containing an auxiliary agent, the viscosity of the mixture to be extruded is high. Therefore, it is most suitable to use a fishtail type T-die (fishtail die) among the above-mentioned dies.

The appropriate thickness of the PTFE sheet obtained by the extrusion in the step A is 0.5 to 5.0 mm, particularly 1.2 to 2.0 mm.

In the step B, the PTFE sheet containing the liquid lubricant is rolled out into a thinner sheet than the sheet obtained by the extrusion. Thus, a sheet having a uniform thickness is obtained. This rolling can be performed, for example, as a process in which the length of the PTFE sheet in the transverse direction is not substantially changed. In this case, the rolling in the step B is a process for stretching the PTFE sheet substantially only in its longitudinal direction.

Specifically, the rolling in the step B can be performed by passing the PTFE sheet between a pair of pressure rolls for rolling while pulling the sheet by a pull roll provided downstream of the pair of pressure rolls in the sheet feeding direction. During the rolling, if the rotational speed of the pull roll is set to a slightly higher speed than that of the pressure rolls, the PTFE sheet is stretched in its longitudinal direction, with the length of the sheet in the transverse direction being maintained substantially unchanged.

Preferably, the rolling of the PTFE sheet in the step B is performed so that the length of the sheet in the transverse direction after the rolling is in a range of 90% to 110%, and preferably in a range of 95% to 105%, of the length of the sheet in the transverse direction before the rolling. In this description, if a change in the length of the sheet in the transverse direction is in the above range, it is deemed that the sheet has been rolled "with the length of the sheet in the transverse direction being maintained substantially unchanged".

In the step B, it is preferable to roll the PTFE sheet into a sheet having a thickness of 50 to 2000 μm, particularly 100 to 300 μm. In the step B, it is preferable to roll the PTFE sheet into a sheet having a reduced thickness to 30% or less, for example 10 to 15%, of the thickness of the sheet before the rolling.

In the step C, the PTFE sheet containing the liquid lubricant is stretched in its transverse direction. This stretching may be performed using a tenter, which has been frequently used for stretching in the transverse direction. The appropriate stretch ratio in the step C is 1.2 to 10, particularly 2.0 to 5.0. If the stretch ratio is too low, it is difficult to change the membrane structure sufficiently. On the other hand, if the stretch ratio is too high, the strength in the longitudinal direction may decrease or the membrane thickness may become uneven.

In the step D, the liquid lubricant is removed from the PTFE sheet that has been stretched in the transverse direction. This step may be performed by drying the PTFE sheet, specifically by maintaining the PTFE sheet containing the liquid lubricant at a temperature suitable for removing the liquid lubricant, as is conventionally done. The temperature suitable for drying is about 100° C. to 300° C.

The rolling in the step B and the stretching in the step C need to be performed on the PTFE sheet containing the liquid lubricant. Therefore, it is preferable to perform these steps while maintaining the temperature of the PTFE sheet at 100° C. or lower, preferably at 40° C. or lower.

In the step E, the PTFE sheet from which the liquid lubricant has been removed is stretched in its longitudinal direction and transverse direction sequentially. Thus, the sheet is made porous. The stretching in the longitudinal direction may be performed by the roll stretching method utilizing a difference in the rotational speed of rolls, and the stretching in the transverse direction may be performed by the tenter stretching method using a tenter, as is conventionally done. Any of the stretching in the longitudinal direction and the stretching in the transverse direction may be performed earlier than the other.

The stretch ratio in the step E has a significant influence on the membrane structure and the membrane properties of the resulting porous PTFE membrane. The stretch ratio in the step E may be set as appropriate according to the desired membrane properties. Generally, a too high stretch ratio leads to, for example, a too low collection efficiency, and a too low stretch ratio leads to, for example, a too high pressure loss.

It is difficult to definitely determine a preferred range of stretch ratios because the appropriate stretch ratio varies depending on the conditions of rolling, stretching, etc. in each step from the step A to the step E. Normally, the stretch ratio in the longitudinal direction is suitably 5 to 30, particularly suitably 10 to 20, and the stretch ratio in the transverse direction is suitably 10 to 40, particularly suitably 20 to 30.

The area stretch ratio is suitably 150 or more, further suitably 250 or more, and particularly suitably 300 or more, so that the pressure loss decreases to an appropriate value. The area stretch ratio is suitably 700 or less, and further suitably 600 or less, to prevent a significant decrease in the collection efficiency. As described above, the area stretch ratio is the stretching factor obtained by multiplying the stretch ratio in the longitudinal direction (longitudinal stretch ratio) and the stretch ratio in the transverse direction (transverse stretch ratio).

Preferably, the stretching in the step E is performed at a temperature lower than the melting point of PTFE (327° C.), for example, at 60° C. to 300° C., particularly at 110° C. to 150° C. Generation of thinner fibrils is promoted by the stretching at a temperature lower than the melting point.

In the step F, the porous PTFE membrane is heated to a temperature equal to or higher than the melting point of PTFE. This heating step is generally referred to as "sintering" and results in an increase in the strength of the porous PTFE sheet. The sintering temperature is suitably 327° C. to 460° C.

As described above, the present invention makes it possible to improve the properties of the membrane determined as values per unit thickness. It is believed that the porous PTFE membrane structure capable of achieving a high-level balance between collection efficiency per unit thickness and pressure loss per unit thickness is also suitable for satisfying the properties required for porous PTFE membranes for use other than in air filter media at a high level. The reason is as follows: Porous PTFE membranes are often required to achieve both resistance and permeability. In other words, they are required to allow selective permeation of target objects and energy. In view of this fact, the membrane structure observed characteristically in the porous PTFE membrane of the present invention is considered essentially suitable for improving the level of the selective permeation.

For example, in recent years, water-proof sound transmitting membranes have been increasingly demanded for use in electronic devices such as mobile phones, and they are required to achieve a high-level balance between water entry pressure and sound transmittance or air permeability, that is, to allow as much acoustic energy or airflow as possible to pass therethrough but prevent water entry thereinto. The membrane structure described above, specifically, the membrane structure including thin and more isotropically extending fibrils and finely-divided nodes, is suitable for meeting such requirements. The use of the porous PTFE membrane of the present invention is not limited to air filter media.

The present invention is intended to provide a porous PTFE membrane having an increased PF value while preventing a significant decrease in the average fibril diameter (average fiber diameter). That is, according to the present invention, it is possible to provide a porous PTFE membrane having an increased PF value of 36 or more, further 37 or more, particularly 38 or more, and in some cases 40 or more, while maintaining the average fiber diameter in a range of 55 nm or more, further 57 nm or more, particularly 58 nm or more, and in some cases 60 nm or more, for example, in a range of 55 to 83 nm, particularly in a range of 55 to 80 nm. The porous PTFE membrane having a large average fiber diameter is advantageous in maintaining the strength.

In addition, according to the present invention, it is possible to provide a porous PTFE membrane having a collection efficiency of 99.999% (5N, as expressed in the form of the number of consecutive 9s) or more, further 99.9999% (6N) or more, particularly 99.99999% (7N) or more, and more particularly 99.999999% (8N) or more. The porous PTFE membrane of the present invention can achieve a pressure loss of, for example, 220 Pa or less, or 200 Pa or less in some cases, while maintaining a collection efficiency as high as the above range of values.

The thickness of the porous PTFE membrane of the present invention is not particularly limited, but the thickness is suitably 5 to 15 µm, further suitably 7 to 13 µm. The thickness may be 8 to 12 µm, for example.

In order to use the obtained porous PTFE membrane as an air filter medium, it is desirable to laminate the membrane with an air-permeable support member. This laminating step may be performed by bonding the porous PTFE membrane and the air-permeable support member together by a conventionally used method.

Preferably, the fibers constituting the air-permeable support member are made of a thermoplastic resin, specifically polyolefin (for example, polyethylene (PE) or polypropylene (PP)), polyester (for example, polyethylene terephthalate (PET)), polyamide, or a composite material of these.

As the air-permeable support member, woven fabric, nonwoven fabric, felt, or the like can be used, but nonwoven fabric is often used. A typical nonwoven fabric known as a preferable air-permeable support member is made of conjugated fibers having a core-sheath structure in which the melting point of the core component (for example, PET) is higher than that of the sheath component (for example, PE). This nonwoven fabric is suitable for heat lamination in which the sheath component is melted and bonded with the porous PTFE membrane.

The lamination of the porous PTFE membrane and the air-permeable support member can also be performed not only by the above-mentioned heat lamination but also by adhesive lamination or the like. In the adhesive lamination, it is appropriate to use a hot melt type adhesive, for example.

The layered structure of the porous PTFE membrane and the air-permeable support member is not particularly limited, but it is preferably a structure in which at least one air-permeable support member is disposed on each of the surfaces of the porous PTFE membrane (typically, a three layer structure including an air-permeable support member, a porous PTFE membrane, and an air-permeable support member in this order). However, the layered structure may be a structure including two porous PTFE membranes (for example, a five layer structure including an air-permeable support member, a porous PTFE membrane, an aid-permeable support member, a porous PTFE membrane, and an air-permeable support member in this order), if required. It is also possible to use a structure including an air-permeable support member with a small diameter as a pre-filter (for example, a four layer structure including an air-permeable support member (pre-filter), an air-permeable support member, a porous PTFE membrane, and an air-permeable support member in this order from the upstream side of the airflow) in some applications.

Air filter media are usually subjected to pleating by a known technique. Pleating is performed by folding a filter medium along mountain folds and valley folds that are formed alternately and in parallel to each other on the surface of the filter medium into an accordion shape (a continuous W shape), for example, using a reciprocating pleating machine. The pleated air filter medium is sometimes referred to as an air filter pack. A spacer may be disposed in the air filter pack to maintain the pleated shape. As the spacer, a resin cord called a bead is often used. A bead is disposed on the filter medium in a direction perpendicular to the mountain folds (valley folds) (in a direction going up the mountains and down the valleys). Preferably, a plurality of beads that are evenly spaced apart from each other are disposed on the filter medium so that they extend in this direction. Preferably, the beads are disposed on both the front and back surfaces of the filter medium. Typically, the beads are formed by melting a resin such as polyamide or polyolefin and applying the molten resin.

Figure 4:
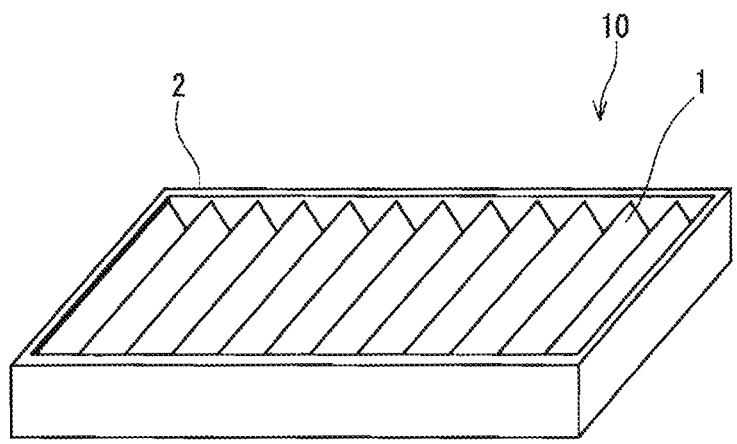
FIG. 4 is a perspective view showing an example of an air filter unit.

The periphery of the pleated air filter medium (air filter pack) is supported by a frame (supporting frame), if necessary. Thus, an air filter unit is obtained. As the frame, a metal or resin member is used for the intended purpose, such as for use in an air filter. When a resin frame is used, a filter medium may be fixed to the frame while forming the frame by injection molding. FIG. 4 shows an example of an air filter unit. An air filter unit 10 includes a pleated air filter medium 1 and a frame 2 for fixing the outer periphery of the air filter medium 1.

Still another aspect of the present invention provides an air filter medium including a single-layer porous PTFE membrane and air-permeable support members disposed on both surfaces of the porous membrane, and having a collection efficiency of 99.999999% (8N) or more, a pressure loss of 250 Pa or less, and a PF value of 35 or more and 45 or less. Conventionally, the collection efficiency of an air filter medium having only one single-layer porous PTFE membrane as a particle collection layer does not reach a 8N level under the condition where the pressure loss is kept at about 250 Pa or lower. The media produced according to the present invention are shown as some of the examples (Examples 1 to 3) described below.

EXAMPLES

Hereinafter, the present invention will be described in further detail by way of examples, but the present invention is not limited to the following examples.

The properties of porous PTFE membranes and air filter media were measured as follows.

[Pressure Loss]

Each of samples (porous PTFE membranes and filter media) was set in a circular holder having an effective area of 100 cm², and a pressure difference was applied between the inlet end and the outlet end of the holder so as to adjust the permeate flow rate through the sample to 5.3 cm/sec with a flowmeter. Then, the pressure loss was measured with a pressure gauge (manometer). The measurement was performed on 8 positions of each sample, and the average value was obtained as the pressure loss of the sample.

[Collection Efficiency]

The same device as used for the measurement of the pressure loss was used. Air containing polydisperse dioctyl phthalate (DOP) particles with a particle diameter of 0.10 μm to 0.20 μm at a concentration of about $10^7$ particles per liter were allowed to flow from the upstream side of each of the samples (porous PTFE membranes and air filter media) at a permeate flow rate of 5.3 cm/sec, and the concentration of the particles on the downstream side was measured with a particle counter. Then, the collection efficiency CE (%) was calculated based on the following Equation (6):

$$CE\ (\%)=\{1-(\text{Downstream Concentration/Upstream Concentration})\}\times100 \qquad (6)$$

The particle diameters of the particles to be measured were in the range of 0.10 μm to 0.20 μm.

[Average Fiber Diameter]

A SEM micrograph (magnification of 10000) taken from directly above the surface of each porous PTFE membrane was prepared. This micrograph was enlarged and printed on an A4 size paper. A measuring line was drawn thereon in a direction corresponding to the longitudinal direction of the porous PTFE membrane, and the diameters of the fibers (fibrils) on the line were measured with calipers. The above measuring line was drawn along the center of the micrograph. When the diameters of overlapping fibers could not be measured on the measuring line, each of these fibers was traced to the measurable portion thereof on the micrograph to measure the diameter. The actual diameter was calculated from the measured value with reference to a reference line indicating the actual length on the SEM micrograph (shown in the lower right of each of FIG. 1 to FIG. 3) as a calibration line.

[Filling Factor]

Each porous PTFE membrane was stamped into a disk shape with a diameter of 47 mm as a specimen. The thickness of this specimen was measured from a cross-sectional SEM micrograph with a magnification of 1000. The weight of this specimen was measured, and the filling factor thereof was measured based on the following Equation (7):

$$\text{Filling Factor (\%)}=(W/SG)/(T\times S)\times100 \qquad (7)$$

where W is the weight of the specimen (unit [g]), SG is the specific gravity of PTFE resin (unit [g/cm³]), T is the thickness of the specimen (unit [cm]), and S is the surface area of the specimen (17.349 cm²).

Example 1

100 parts by weight of PTFE fine powder ("Polyflon F-104", SSG of 2.171, manufactured by Daikin Industries, Ltd.) and 19 parts by weight of a liquid lubricant (dodecane) were mixed homogeneously to obtain a mixture. Next, this mixture was extruded into a sheet form using an extruder equipped with a fishtail die. The thickness of the PTFE sheet thus obtained by the extrusion was 1.5 mm, and the width thereof was 20 cm.

Furthermore, the PTFE sheet was rolled by being passed between a pair of metal pressure rolls. This rolling was performed while pulling the PTFE sheet in its longitudinal direction using a pull roll provided downstream of the pressure rolls, so as to keep the length of the PTFE sheet in the transverse direction unchanged before and after the rolling. The thickness of the PTFE sheet obtained by the rolling was 200 μm.

Subsequently, the rolled PTFE sheet containing the liquid lubricant was stretched in its transverse direction at a stretch ratio of 4 using a tenter. Then, the stretched PTFE sheet was maintained at 150° C. to remove the liquid lubricant.

After the liquid lubricant was removed, the PTFE sheet was stretched in its longitudinal direction at a stretch ratio of 12 at a stretching temperature of 280° C. by the roll stretching, and further stretched in its transverse direction at a stretch ratio of 30 at a stretching temperature of 110° C. by the tenter stretching. Thus, an unsintered porous PTFE membrane was obtained. The area stretch ratio of the stretchings performed after the liquid lubricant was removed was 360.

Finally, the unsintered porous PTFE membrane was sintered in a hot air furnace at 400° C., and a long strip of porous PTFE membrane was obtained.

The above porous PTFE membrane was sandwiched between two sheets of core-sheath nonwoven fabric (with a mass per unit area of 30 g/m$^2$, a core component of PET, a sheath component of PE, an apparent density of 0.158 g/cm$^2$, an embossed area ratio of 15%, and a thickness of 0.19 mm), and passed between a pair of rolls heated to 180° C. and thereby heat-laminated. Thus, a three-layer air filter medium (a very long filter medium with a width of 1200 mm and a length of 200 m) was obtained.

Next, the resulting air filter medium was pleated (186 pleats with a pleat height (or pleat width) of 50 mm). The pleated air filter medium was cut into a smaller medium, and a metallic support frame was bonded to the periphery of the medium with an adhesive. Thus, an air filter unit (dimensions of 610 mm×610 mm×65 mm thick) was obtained.

Example 2

A porous PTFE membrane was produced in the same manner as in Example 1, except that the PTFE sheet from which the liquid lubricant had been removed was stretched in its longitudinal direction at a stretch ratio of 14. An air filter unit was produced using this porous PTFE membrane in the same manner as in Example 1.

Example 3

A porous PTFE membrane was produced in the same manner as in Example 2, except that the PTFE sheet from which the liquid lubricant had been removed was stretched in its transverse direction at a stretching temperature of 60° C. An air filter unit was produced using this porous PTFE membrane in the same manner as in Example 1.

Example 4

A porous PTFE membrane was produced in the same manner as in Example 2, except that the PTFE sheet from which the liquid lubricant had been removed was stretched in its transverse direction at a stretching temperature of 160° C. An air filter unit was produced using this porous PTFE membrane in the same manner as in Example 1.

Example 5

A porous PTFE membrane was produced in the same manner as in Example 2, except that the PTFE sheet from which the liquid lubricant had been removed was stretched in its longitudinal direction at a stretch ratio of 27. An air filter unit was produced using this porous PTFE membrane in the same manner as in Example 1.

Example 6

A porous PTFE membrane was produced in the same manner as in Example 2, except that "Fluon CD-145" (SSG of 2.165) manufactured by Asahi Fluoropolymers Co., Ltd. was used as a PTFE fine powder. An air filter unit was produced using this porous PTFE membrane in the same manner as in Example 1.

Example 7

A porous PTFE membrane was produced in the same manner as in Example 2, except that "Fluon CD-123N" (SSG of 2.155) manufactured by Asahi Fluoropolymers Co., Ltd. was used as a PTFE fine powder. An air filter unit was produced using this porous PTFE membrane in the same manner as in Example 1.

Example 8

A porous PTFE membrane was produced in the same manner as in Example 7, except that the PTFE sheet from which the liquid lubricant had been removed was stretched in its longitudinal direction at a stretch ratio of 18. An air filter unit was produced using this porous PTFE membrane in the same manner as in Example 1.

Comparative Example 1

A porous PTFE membrane was produced in the same manner as in Example 2, except that the step of stretching the rolled PTFE sheet containing the liquid lubricant in its transverse direction was omitted and that the PTFE sheet from which the liquid lubricant had been removed was stretched in its longitudinal direction at a stretch ratio of 10. An air filter unit was produced using this porous PTFE membrane in the same manner as in Example 1.

Comparative Example 2

A porous PTFE membrane was produced in the same manner as in Comparative Example 1, except that the PTFE sheet from which the liquid lubricant had been removed was stretched in its longitudinal direction at a stretch ratio of 14. An air filter unit was produced using this porous PTFE membrane in the same manner as in Example 1.

Comparative Example 3

A porous PTFE membrane was produced in the same manner as in Comparative Example 1, except that the PTFE sheet from which the liquid lubricant had been removed was stretched in its longitudinal direction at a stretch ratio of 18.

An air filter unit was produced using this porous PTFE membrane in the same manner as in Example 1. An air filter medium used in Comparative Example 3 had a five-layer structure in which three nonwoven fabrics and two porous PTFE membranes were alternately laminated so that each of the porous PTFE membranes was sandwiched between the nonwoven fabrics.

Comparative Example 4

An attempt was made to produce a porous PTFE membrane in the same manner as in Example 2, except that "Fluon CD-1" (SSG of 2.20) manufactured by Asahi Fluoropolymers Co., Ltd. was used as a PTFE fine powder. However, the sheet was broken in the step of stretching it in its transverse direction after the liquid lubricant was removed, and a porous membrane could not be obtained. Therefore, the stretch ratio in the transverse direction was reduced to 10 and the stretch ratio in the longitudinal direction was increased to 20 to promote the formation of pores in the membrane. As a result, a porous PTFE membrane having the same thickness as that of Example 2 was obtained. In this comparative example, the sintering temperature in the sintering step (Step F) was 360° C. An air filter unit was produced using this porous PTFE membrane in the same manner as in Example 1.

Figure 2:
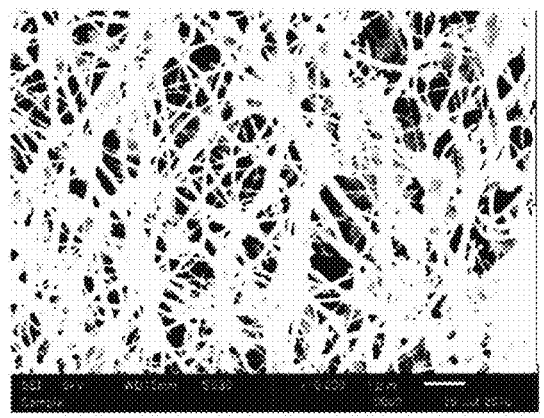
FIG. 2 is a SEM micrograph of a porous PTFE membrane obtained in Comparative Example 3.

Tables 1 and 2 show the measurement results of the properties of the porous PTFE membranes and the air filter units obtained in Examples and Comparative Examples. FIGS. 1 to 3 show the SEM micrographs of the porous PTFE membranes obtained in Example 2, Comparative Example 3, and Comparative Example 4, respectively.

As shown in Table 1, in each Example, a porous PTFE membrane having a PF value of 36 or more, a mass per unit area of 0.90 g/m$^2$ or less, and an average fiber diameter of 55 to 83 nm was obtained. In FIG. 1, it is observed that thin fibrils extend in random directions and nodes are finely divided in the porous PTFE membrane. The collection efficiency of the porous PTFE membrane obtained in Example 5 was low because the area stretch ratio was slightly too high.

In each of Comparative Examples 1 to 3, an increase in the PF value was limited because the transverse wet stretching was not performed. In these comparative examples, porous PTFE membranes including slightly thicker fibrils, as shown in FIG. 2, were obtained. The PF value of the porous PTFE membrane obtained in Comparative Example 4 was very low. This porous membrane had a structure, as shown in FIG. 3, in which nodes were not finely divided and most fibrils extended in the two stretching directions.

The porous PTFE membranes obtained in Examples 2 and 6 to 8 each had a collection efficiency per 1 μm thickness of 76% or more and less than 85% and a pressure loss per 1 μm thickness of 13 Pa or more and 19.5 Pa or less. The porous PTFE membranes obtained in Examples 1 and 3 each had a collection efficiency per 1 μm thickness of 85% or more and 90% or less and a pressure loss per 1 μm thickness of 20 Pa or more and 25 Pa or less. Porous PTFE membranes having such desirable values as mentioned above in the properties per unit thickness could be produced because of the above-described improvements in the production method.

In addition, the air filter media obtained in Examples 1 to 3 each exhibited the properties of a collection efficiency of 8N or more, a pressure loss of 250 Pa or less, and a PF value of 35 or more and 45 or less (a PF value of 37 or more in Examples 1 and 2), although they are filter media having a simple three-layer structure including one single-layer porous PTFE membrane and two nonwoven fabrics placed on both surfaces of the porous membrane.

The air filter media of Examples 1 to 3 each have a very high collection efficiency as well as a pressure loss at a practically acceptable level, and are particularly suitable for use in the field of filtering that focuses on the collection of particles. A conventionally known porous PTFE membrane having a high PF value is obtained by focusing on the increase in the distance between fibrils as the first priority to increase the PF value. Therefore, the essential feature of a filter medium using this membrane lies not in its high collection efficiency but in its low pressure loss (Patent Literature 2). In contrast, the PF values of the air filter media of the present invention, in particular the air filter media of Examples 1 to 3, are increased not by an improvement in the pressure loss but by a significant improvement in the collection efficiency. Therefore, they exhibit new features that have not been observed in conventional filter media.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| | PTFE | F104 | F104 | F104 | F104 | F104 | CD145 | CD123 | CD123 |
| | (Standard specific gravity) | (2.17) | (2.17) | (2.17) | (2.17) | (2.17) | (2.165) | (2.155) | (2.155) |
| | Stretch ratio of transverse wet stretching | 4 | 4 | 4 | 4 | 4 | 4 | 4 | 4 |
| Longitudinal stretch conditions | Stretch ratio (i) | 12 | 14 | 14 | 14 | 27 | 14 | 14 | 18 |
| | Temperature (° C.) | 280 | 280 | 280 | 280 | 280 | 280 | 280 | 280 |
| Transverse stretch conditions | Stretch ratio (ii) | 30 | 30 | 30 | 30 | 30 | 30 | 30 | 30 |
| | Temperature (° C.) | 110 | 110 | 60 | 160 | 110 | 110 | 110 | 110 |
| | Area stretch ratio (i) × (ii) | 360 | 420 | 420 | 420 | 810 | 420 | 420 | 540 |
| | Filter medium structure | 3 layers | 3 layers | 3 layers | 3 layers | 3 layers | 3 layers | 3 layers | 3 layers |
| Porous PTFE membrane | Thickness (μm) (iii) | 10 | 11 | 10 | 12 | 8 | 10 | 10 | 9 |
| | Average fiber diameter (nm) | 65 | 58 | 66 | 78 | 79 | 77 | 69 | 72 |
| | Filling factor (%) | 3.9 | 3.2 | 3.8 | 2.9 | 2.5 | 3.7 | 3.5 | 3.2 |
| | Mass per unit area (g/m$^2$) | 0.85 | 0.76 | 0.82 | 0.76 | 0.43 | 0.80 | 0.76 | 0.62 |
| | Pressure loss (Pa) (iv) | 208.9 | 180.2 | 217.8 | 142.1 | 52.0 | 153.0 | 191.0 | 147.0 |
| | Pressure loss per unit thickness (iv)/(iii) | 20.9 | 16.4 | 21.8 | 11.8 | 6.5 | 15.3 | 19.1 | 16.3 |
| | Collection efficiency (v)[1] | 9N0 | 8N5 | 9N0 | 5N8 | 1N8 | 6N5 | 7N8 | 5N8 |
| | Collection efficiency per unit thickness[2] | 87.4 | 82.4 | 87.4 | 67.9 | 43.1 | 76.6 | 83.0 | 76.7 |
| | PF value | 42.2 | 45.1 | 40.5 | 40.8 | 37.0 | 40.4 | 39.5 | 38.0 |
| Filter medium | Pressure loss | 234.0 | 194.6 | 246.1 | 160.6 | 58.8 | 168.3 | 210.1 | 161.7 |
| | Collection efficiency[1] | 9N0 | 8N5 | 9N0 | 5N8 | 2N1 | 6N5 | 7N8 | 5N8 |
| | PF value | 37.7 | 41.8 | 35.8 | 36.1 | 32.7 | 36.7 | 35.9 | 34.5 |

[1]Collection efficiency (%) is expressed in the form of "(the number of consecutive 9s) N (FIGURE following the last 9)" (for example, "9N0" indicates 99.99999990).
[2]Calculated using (iii) and (v) by Equation (4).

TABLE 2

|  |  | Com. Ex. 1 | Com. Ex. 2 | Com. Ex. 3 | Com. Ex. 4 |
|---|---|---|---|---|---|
|  | PTFE | F104 | F104 | F104 | CD1 |
|  | (Standard specific gravity) | (2.17) | (2.17) | (2.17) | (2.20) |
|  | Stretch ratio of transverse wet stretching | — | — | — | 4 |
| Longitudinal stretch conditions | Stretch ratio (i) | 10 | 14 | 18 | 20 |
|  | Temperature (° C.) | 280 | 280 | 280 | 280 |
| Transverse stretch conditions | Stretch ratio (ii) | 30 | 30 | 30 | 10 |
|  | Temperature (° C.) | 110 | 110 | 110 | 110 |
|  | Area stretch ratio (i) × (ii) | 300 | 420 | 540 | 200 |
|  | Filter medium structure | 3 layers | 3 layers | 5 layers | 3 layers |
| Porous PTFE membrane | Thickness (μm) (iii) | 10 | 10 | 10 | 11 |
|  | Average fiber diameter (nm) | 100 | 105 | 120 | 685 |
|  | Filling factor (%) | 4.4 | 4.3 | 4.0 | 4.2 |
|  | Mass per unit area (g/m$^2$) | 0.95 | 0.93 | 0.87 | 1.00 |
|  | Pressure loss (Pa) (iv) | 251.0 | 160.6 | 95.5 | 12.5 |
|  | Pressure loss per unit thickness (iv)/(iii) | 25.1 | 16.1 | 9.6 | 1.1 |
|  | Collection efficiency (v)[1)] | 6N0 | 5N7 | 3N4 | 0N5 (52%) |
|  | Collection efficiency per unit thickness[2)] | 74.9 | 72.0 | 52.8 | 6.5 |
|  | PF value | 23.4 | 33.7 | 33.4 | 25.1 |
| Filter medium | Pressure loss | 276.1 | 170.2 | 214.0 | 14.3 |
|  | Collection efficiency[1)] | 6N0 | 5N7 | 6N7 | 0N5 (52%) |
|  | PF value | 21.3 | 31.8 | 29.9 | 21.8 |

[1)] and [2)] See the footnotes of Table 1

The invention claimed is:

1. A porous polytetrafluoroethylene membrane having a PF value of 36 or more and a mass per unit area of 0.90 g/m$^2$ or less, the PF value being determined by the following equation:

PF value={−log(*PT* (%)/100)/(PL(*Pa*)/9.8)}×100 where PT is a permeability and is determined by PT (%)=100−CE (%), CE is a collection efficiency and is determined by a value measured using dioctyl phthalate particles with a particle diameter of 0.10 μm to 0.20 μm under a condition of a permeate flow rate of 5.3 cm/sec, and PL is a pressure loss and is determined by a value measured under a condition of a permeate flow rate of 5.3 cm/sec.

2. The porous polytetrafluoroethylene membrane according to claim 1, wherein the membrane includes fibrils constituting a porous structure of the membrane, and the fibrils have an average diameter of 55 nm or more and 83 nm or less.

3. The porous polytetrafluoroethylene membrane according to claim 2, wherein the PF value is 38 or more.

4. The porous polytetrafluoroethylene membrane according to claim 1, wherein a polymer constituting the membrane is made of only one type of monomer, and the monomer is tetrafluoroethylene.

5. The porous polytetrafluoroethylene membrane according to claim 1, wherein the membrane is a single-layer membrane.

6. The porous polytetrafluoroethylene membrane according to claim 1, wherein the membrane has a collection efficiency per 1 μm thickness CE(t) of 76% or more, the CE(t) being determined by the following equation:

CE(*t*)(%)={1−(1−CE (%)/100)$^{1/t}$}×100 where t is a thickness of the porous polytetrafluoroethylene membrane, and the thickness is measured in units of micrometers (μm).

7. The porous polytetrafluoroethylene membrane according to claim 6, wherein the CE(t) is 80% or more.

8. An air filter medium comprising: the porous polytetrafluoroethylene membrane according to claim 1; and an air-permeable support member laminated on the membrane.

9. An air filter pack comprising the air filter medium according to claim 8, wherein the air filter pack is obtained by pleating the air filter medium.

10. An air filter unit comprising: the air filter pack according to claim 9; and a frame that supports a periphery of the air filter pack.

* * * * *